United States Patent
Hampel et al.

(10) Patent No.: US 9,160,006 B2
(45) Date of Patent: Oct. 13, 2015

(54) CHEMICALLY TREATED CURRENT COLLECTOR FOIL MADE OF ALUMINIUM OR AN ALUMINIUM ALLOY

(71) Applicants: Ulrich Hampel, Grevenbroich (DE); Volker Denkmann, Kempen (DE); Andreas Siemen, Jüchen (DE); Kathrin Eckhard, Bonn (DE); Wilhelm Schenkel, Grevenbroich (DE); Sandra Eberhard, Jüchen (DE); Dieter Bögershausen, Grevenbroich (DE)

(72) Inventors: Ulrich Hampel, Grevenbroich (DE); Volker Denkmann, Kempen (DE); Andreas Siemen, Jüchen (DE); Kathrin Eckhard, Bonn (DE); Wilhelm Schenkel, Grevenbroich (DE); Sandra Eberhard, Jüchen (DE); Dieter Bögershausen, Grevenbroich (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 14/107,824

(22) Filed: Dec. 16, 2013

(65) Prior Publication Data
US 2014/0096375 A1 Apr. 10, 2014

Related U.S. Application Data

(63) Continuation of application No. PCT/EP2012/060186, filed on May 30, 2012.

(30) Foreign Application Priority Data

Jun. 21, 2011 (EP) .................. 11170833

(51) Int. Cl.
*H01M 4/66* (2006.01)
*H01M 2/00* (2006.01)
*C23C 22/78* (2006.01)
*C23G 1/00* (2006.01)
(Continued)

(52) U.S. Cl.
CPC ............. *H01M 4/661* (2013.01); *C23C 22/78* (2013.01); *C23G 1/00* (2013.01); *C23G 3/021* (2013.01); *H01M 2/00* (2013.01); *H01M 4/667* (2013.01); *H01M 10/0525* (2013.01); *Y10T 29/49108* (2015.01)

(58) Field of Classification Search
CPC ... H01M 10/0525; H01M 2/00; H01M 4/661; H01M 4/667; C23C 22/78; C23G 1/00; C23G 3/021
See application file for complete search history.

(56) References Cited

U.S. PATENT DOCUMENTS

| | | | | |
|---|---|---|---|---|
| 4,042,475 | A | * | 8/1977 | Bijlmer .................. 205/723 |
| 4,611,479 | A | * | 9/1986 | Guttinger ................ 72/11.7 |
| 2002/0102348 | A1 | * | 8/2002 | Yagi et al. ................ 427/58 |

(Continued)

FOREIGN PATENT DOCUMENTS

| | | |
|---|---|---|
| CN | 1275820 A | 12/2000 |
| CN | 1551385 A | 12/2004 |

(Continued)

*Primary Examiner* — Carlos Barcena
(74) *Attorney, Agent, or Firm* — Reinhart Boerner Van Deuren P.C.

(57) ABSTRACT

The invention relates to a current collector foil made of aluminum or an aluminum alloy, to the use of the current collector foil for batteries or accumulators, in particular lithium-ion accumulators, and to a method for producing the current collector foil. The object of providing a current collector foil, which has very good properties with regard to conductivity and tensile strength, and which can also be produced economically, is achieved in that the current collector foil has an acid-pickled or alkali-pickled surface.

10 Claims, 1 Drawing Sheet

(51) Int. Cl.
*C23G 3/02* (2006.01)
*H01M 10/0525* (2010.01)

(56) References Cited

U.S. PATENT DOCUMENTS

| | | | |
|---|---|---|---|
| 2004/0219433 A1* | 11/2004 | Besner et al. | 429/233 |
| 2004/0234858 A1* | 11/2004 | Torimae et al. | 429/231.95 |
| 2005/0118440 A1 | 6/2005 | Mahon et al. | |
| 2009/0029609 A1 | 1/2009 | Breece et al. | |
| 2009/0269609 A1* | 10/2009 | Hirayama | 428/606 |
| 2011/0171525 A1* | 7/2011 | Abe et al. | 429/212 |
| 2011/0287288 A1* | 11/2011 | Hina et al. | 429/94 |

FOREIGN PATENT DOCUMENTS

| | | |
|---|---|---|
| CN | 1910309 A | 2/2007 |
| CN | 101276937 A | 10/2008 |
| DE | 35 19 090 A1 | 12/1986 |
| EP | 2 202 823 A1 | 6/2010 |
| JP | 2000-048822 A | 2/2000 |
| JP | 2005 2371 A | 1/2005 |
| JP | 2007 250376 A | 9/2006 |
| JP | 2008 060125 A | 3/2008 |
| JP | 2008 258010 A | 10/2008 |
| JP | 2009 009778 A | 1/2009 |
| JP | 2009 024262 A | 2/2009 |
| JP | 4945016 B1 | 6/2012 |
| JP | 2012-230777 | 11/2012 |
| WO | WO 2007 045676 A1 | 4/2007 |
| WO | WO 2010/086903 | 8/2010 |
| WO | WO 2010086903 A1 * 8/2010 ........ H01M 10/0587 |
| WO | WO 2012/063740 A1 | 5/2012 |

* cited by examiner

CHEMICALLY TREATED CURRENT COLLECTOR FOIL MADE OF ALUMINIUM OR AN ALUMINIUM ALLOY

CROSS-REFERENCE TO RELATED PATENT APPLICATIONS

This patent application is a continuation of PCT/EP2012/060186, filed May 30, 2012, which claims priority to European Application No. 11170833.5, filed Jun. 21, 2011, the entire teachings and disclosure of which are incorporated herein by reference thereto.

FIELD OF THE INVENTION

The invention relates to a current collector foil made of aluminium or an aluminium alloy, the use of the current collector foil for batteries or accumulators, in particular lithium-ion accumulators, and to a method for producing the current collector foil.

BACKGROUND OF THE INVENTION

Current collector foils often consist of an aluminium foil and additionally have a coating, which generally consists of a metal oxide, for example a lithium cobalt (III) oxide. An aluminium foil will be understood hereinafter to mean a foil consisting of aluminium or an aluminium alloy. During their production, aluminium foils are generally wetted with a rolling oil during the rolling process, for example so as to minimise friction effects, roller wear, or sticking of the rolled product during the rolling operation. However, the rolling oil must generally be removed again before further use of the aluminium foil. In particular with the use of aluminium foils for lithium-ion accumulators, for example as a current collector foil, the quality of the aluminium foil affects the quality of the produced lithium-ion accumulators. It is known from the prior art to clean, in particular to degrease, aluminium foil coated with rolling oil by subjecting the aluminium foil in the form of foil windings, so-called "coils", to a thermal treatment. However, the hard-rolled foil softens and recrystallizes according to temperature and treatment time. The aluminium foil loses a considerable amount of strength and is more difficult to process. In addition, the oxide layer thickens as a result of the heat treatment due to the influence of temperature and oxygen, which leads to an increased electrical resistance of the current collector foil. If the rolling oil is not removed completely, problems with regard to the adhesion of the metal oxide layer may also be encountered.

In order to solve the problem of softening, it is proposed in published patent application US 2009/0269609 to carry out a thermal treatment at temperatures between 80° C. and 160° C. However, it has been found that, depending on the temperature, time, winding structure of the coil and the surface roughness of the aluminium foil, thermal treatment cannot remove the rolling oil completely from a foil winding. Particularly at the low temperatures of 80° C. to 160° C., there is a risk that rolling oil residues remain on the aluminium foil, which is problematic for further processing, for example coating with metal oxide.

In addition, acid or alkali cleaning of aluminium strips, for example in a coil-to-coil method, is known. Aluminium strips are generally more than 100 μm thick, usually more than 200 μm thick. However, current collector foils are more than 2 to 8 times thinner than the aluminium strips cleaned previously by means of wet-chemical methods.

An aluminium current collector foil which is used for example in rechargeable batteries is known for example from JP 2008 258010 A. A degreasing treatment is carried in order to clean the aluminium foil after rolling from oil, wherein acids and bases can be used. These are used for dissolving the oil without causing damage to the material.

On this basis, the object of the invention is to provide a current collector foil, which has very good properties with regard to conductivity and tensile strength, and which can also be produced economically. In addition, the object of the invention is to propose a method for producing the current collector foil as well as advantageous uses of the current collector foil.

SUMMARY OF THE INVENTION

The object is achieved in accordance with a first teaching by a current collector foil, in that the current collector foil has an acid-pickled or alkali-pickled surface.

It has been found that a current collector foil which has an acid-pickled or alkali-pickled surface possesses lower electrical resistances and also improved adhesion properties with regard to coating with metal oxide. In particular, no softening takes place, since the heat treatment is omitted. This means that foils of relatively high mechanical strength can be used as current collector foil. It is possible for the current collector foils to be thinner. When pickling the current collector foil, an acid, for example sulphuric acid, or a base, for example sodium hydroxide solution, can be used for pickling. Both pickling agents may produce a sufficient pickling rate.

Preferably, the pickling rate is set in such a way that the removed thickness is less than 1 μm, in particular less than 0.5 μm or preferably 0.01 to 0.1 μm. The oxide layer of the foil present after rolling is therefore removed substantially by the pickling attack, and therefore a new aluminium oxide layer is formed as a result of the ambient oxygen. As a result of this surface removal, the rolling oil residues can be reliably removed, and it is thus possible to dispense with the degreasing by annealing. As already mentioned, the mechanical strength of the current collector foil thus remains unchanged. The aluminium oxide layer which forms after the surface removal is also much thinner than the oxide layer formed as a result of the hot-rolling and the further rolling processes. The electrical resistance of the current collector foil according to the invention is therefore less than that of conventional current collector foils.

According to a preferred embodiment of the current collector foil according to the invention, the surface is acid-pickled or alkali-pickled in a coil-to-coil method. This has the advantage that the current collector foil can be produced particularly economically and additionally has particularly uniform surface properties, so that consistent quality of the current collector foil can be provided. It has surprisingly also been found that the devices used to degrease aluminium strips by acid-pickling or alkali-pickling are also suitable for use with very thin current collector foils.

In accordance with a further embodiment of the current collector foil, said foil has a thickness from 5 μm to 50 μm, preferably 10 μm to 30 μm, particularly preferably 15 to 25 μm. The low thicknesses of the current collector foil make it possible to produce particularly compact batteries or accumulators, for example lithium-ion accumulators. Extremely thin current collector foils with a thickness of 5 μm are relatively difficult to process, but require the least material. By contrast, the use of current collector foils having a thickness of more than 50 µm may lead to restrictions with regard to the number of layers with a predefined size of the accumulator or battery.

In accordance with a further embodiment of the current collector foils, said foil has a tensile strength in the hard-rolled state H18 of more than 135 MPa, and therefore the current collector foil can also be used easily in subsequent processing steps, for example coating and further processing to form a battery or accumulator, in spite of its low thickness.

In contrast to aluminium foils which are used for electrolytic capacitors, the surface roughness of the current collector foil $R_A$ is 0.01 µm to 1 µm, preferably 0.2 µm to 0.3 µm. The current collector foil therefore preferably has a gloss or high-gloss surface. It has been found that, for use as a current collector foil, these surface properties have led to improved results in terms of electrical resistance and coating properties.

In order to improve the economic viability of the current collector foil, said foil has a width of 400 mm to 1450 mm, preferably 450 mm to 1200 mm. This very wide current collector foil can also be used for the production of batteries or accumulators of high capacity, for example for electric vehicles, which have corresponding widths. The aforementioned widths of the current collector foil can easily be provided by the rolled aluminium foil.

The aluminium alloys of type EN AW 1050, EN AW 1200 or EN AW 1085 have proven to be effective as a material for the current collector foils. Compared to pure aluminium, these have improved mechanical characteristics and ensure a very low level of influence on any undesired chemical processes between the metal oxide coating and the current collector foil, for example corrosion, due to the small proportions of alloy additives.

In accordance with a further embodiment of the current collector foil according to the invention, said foil has a surface passivation on one or both sides. For example, the surface passivation can be achieved by chromating or by coating with a chromium-free passivation layer. For example, a chromium-free passivation variant can be provided on the basis of silanes, titanium, or zirconium or other elements, or combinations thereof. In particular, the passivation is used to suppress the surface state, particularly the formation of aluminium oxides, and therefore the electrical properties of the current collector foil remain constant after passivation. At the same time, passivation also improves the adhesion of the metal oxide coating.

In accordance with a second teaching of the present invention, the object presented above is achieved by a method for producing a current collector foil for a battery, an accumulator, or a lithium-ion accumulator, in which a foil consisting of an aluminium alloy is first produced by hot-rolling and/or cold-rolling to an end thickness of 5 µm to 50 µm, and then, after the rolling operation, the foil is subjected to wet-chemical acid or wet-chemical alkali surface pickling. As already mentioned, the current collector foil thus produced has much better electrical and also mechanical properties, and therefore it can be processed further more easily to form a battery or an accumulator.

If the wet-chemical acid or wet-chemical alkali surface pickling is carried out in a coil-to-coil method, the production costs for producing a corresponding current collector foil can be reduced further still.

As already mentioned above, the current collector foil is preferably produced from an aluminium alloy of type EN AW 1050, EN AW 1200 or EN AW 1085. Reference is made to the discussion above with regard to the advantages of these aluminium alloys.

If the current collector foil is gloss-rolled or high-gloss-rolled to an end finish, a surface which is advantageous for the use as a current collector foil can be provided in conjunction with the surface pickling. The surface roughness $R_A$ is preferably 0.01 µm to 1 µm, more preferably 0.2 to 0.3 µm.

If, in accordance with a further embodiment, the pickled surface of the current collector foil is passivated, the surface state can be preserved for the next processing step and the electrical properties thereof can thus be optimised. The surface of the foil is preferably passivated by chromating or by chromium-free passivation, preferably in a dipping method and alternatively in a no-rinse method. These methods can easily be carried out inline, that is to say directly after the wet-chemical pickling operation.

The width of the foil is preferably 400 mm to 1450 mm, and therefore current collector foils of very large widths can be provided. These very wide current collector foils, for example with a width of more than 700 mm, are used in the production of lithium-ion accumulators for the electric drives of motor vehicles.

In accordance with a third teaching of the present invention, the object presented above is lastly achieved by the use of a current collector foil according to the invention for the production of batteries, accumulators, lithium-ion accumulators, or lithium-ion batteries. As already mentioned, the use of the current collector foil according to the invention leads to a considerable cost advantage compared to the use of conventional current collector foils. In addition, the processing properties in terms of mechanical strength and the coating properties of the current collector foil according to the invention are improved.

BRIEF DESCRIPTION OF THE DRAWINGS

The invention will be explained in greater detail on the basis of exemplary embodiments in conjunction with the drawing, in which.

DETAILED DESCRIPTION OF THE INVENTION

Figure 1:
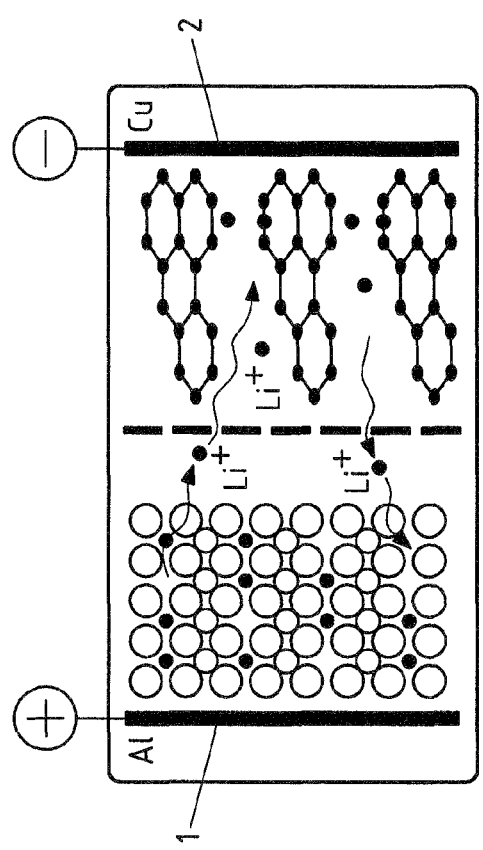
FIG. 1 shows a schematic sectional view of a lithium-ion accumulator.

In a battery, for example in a lithium-ion battery or a lithium-ion accumulator, the electrical energy in lithium atoms and transition metal ions is stored in a chemical process by substance change. In the lithium-ion accumulator, lithium in ionised form can move to and fro through the electrolyte between the two electrodes 1 and 2 so that charging and discharging processes are carried out. As can be seen in FIG. 1, an aluminium electrode is often used on the positive side, on which a lithium metal oxide, for example lithium cobalt dioxide, is deposited. The current collector foils, which are used as a positive electrode 1, preferably have a thickness between 15 and 25 µm and are produced from the aluminium alloys of the type EN AW 1050, EN AW 1200 or EN AW 1085. In contrast to lithium-ion accumulators which are used in smaller electrical devices, for example mobile phones, lithium-ion accumulators used to power electric vehicles for example have relatively large widths so as to provide the necessary capacity.

For example widths of 400 mm to 1450 mm, preferably 450 mm to 1200 mm are conceivable.

So as to further improve the properties of the current collector foils, after having been rolled to an end thickness, said foils are subjected in accordance with the invention to acid-pickling or alkali-pickling so that the surface is alkali-pickled or acid-pickled. With a pickling rate of 0.01 μm to 0.1 μm, the natural oxide layer, which is formed during the production process during hot-rolling or cold-rolling, is thus removed. The newly forming aluminium oxide layer is substantially thinner and leads directly to a reduction in the electrical resistance when current flows from the coating of the current collector foil into the aluminium foil.

Figure 2:
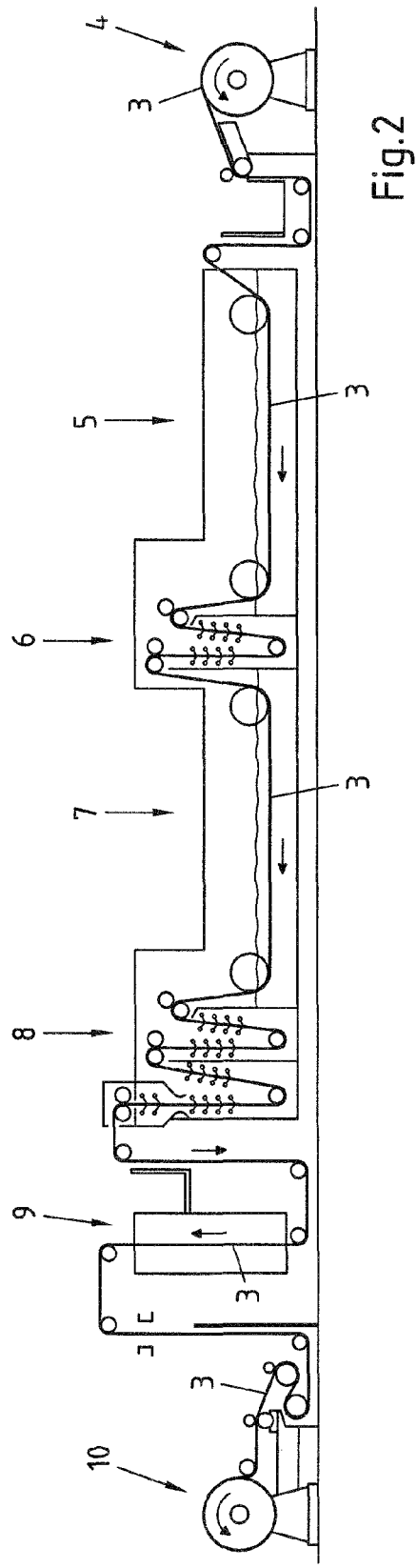
FIG. 2 shows a schematic sectional view of a device for carrying out an exemplary embodiment of a method according to the invention.

With reference to FIG. 2, an exemplary embodiment for carrying out the method according to the invention is illustrated, in which, in a coil-to-coil method, an aluminium foil is pickled, surface-passivated and then rolled up again. A coil 3 on a decoiler 4 is first fed to a degreasing immersion bath 5, in which the aluminium foil is surface-pickled. For example, sulphuric acid or else sodium hydroxide solution can be used as a pickling medium. With use of an alkali pickle, for example sodium hydroxide solution, the foil is preferably rinsed with acid after the immersion bath 5 and an acid dip is carried out. Pickle residues in particular, which adhere to the aluminium foil, can thus be removed more easily. In the case of acid pickling, rinsing and therefore removal of the pickle, for example with water, is sufficient. The rinsing operation 6 preferably takes place directly after the immersion bath. In the illustrated exemplary embodiment, the aluminium foil 3 is fed directly after the rinsing operation 6 for surface passivation, for example for chromating, so that the surface state of the aluminium foil is preserved after the pickling step. Chromating 7 likewise takes place in a dipping process. The foil 3 can then be subjected to a further rinsing process 8, in which excess components of the surface passivation are removed. The surface-passivated aluminium foil then undergoes a drying process so as to dry the surface passivation layer. Lastly, the aluminium foil 3 is rolled up on a recoiler 10. As can be seen in the exemplary embodiment from FIG. 2, the surface passivation is carried out inline with the surface pickling of the aluminium foil. The width of the aluminium foil may be between 400 mm and 1450 mm in the illustrated exemplary embodiment. Due to coil-to-coil processing, a particularly consistent quality of the current collector foil can also be ensured in addition to high production speed, and very wide current collector foils can also be provided.

The invention claimed is:

1. A current collector foil of a battery, of an accumulator, or of a lithium-ion accumulator, comprising an aluminium alloy of the type EN AW 1050, EN AW 1200 or EN AW 1085 in the hard-rolled state H18 and comprising an acid-pickled or alkali-pickled surface, wherein a surface roughness of the current collector foil $R_A$ is 0.01 μm to 1 μm, wherein the current collector foil has uniform surface properties, wherein the surface is pickled in such a way that a removed thickness is less than 1 μm, and wherein the current collector foil has a tensile strength in the hard-rolled state H18 of more than 135 MPa wherein the current collector foil has a surface passivation on one or both sides.

2. The current collector foil according to claim 1, wherein the surface of the current collector foil is acid-pickled or alkali-pickled in a coil-to-coil method.

3. The current collector foil according to claim 1, wherein the current collector foil has a thickness from 5 μm to 50 μm.

4. The current collector foil according to claim 1, wherein the current collector foil has a width of 400 mm to 1450 mm.

5. The current collector foil according to claim 1, wherein the surface passivation has a chromate coating or a chromium-free passivation layer.

6. The current collector foil according to claim 1, wherein the surface roughness of the current collector foil $R_A$ is 0.2 μm to 0.3 μm.

7. A method for producing a current collector foil for a battery, an accumulator, or a lithium-ion accumulator, according to claim 1, comprising producing an aluminium alloy of the type EN AW 1050, EN AW 1200 or EN AW 1085 first by hot-rolling and/or cold-rolling to an end thickness of 5 μm to 50 μm, and then, after the rolling operation, subjecting the foil to wet-chemical acid or wet-chemical alkali surface pickling in a coil-to-coil method, wherein the pickling rate is set in such a way that the removed thickness is less than 1 μm, wherein the pickled surface of the foil is passivated.

8. The method according to claim 7, wherein the pickling rate is set in such a way that the removed thickness is less than 0.5 μm.

9. The method according to claim 7, wherein the width of the foil is 400 mm to 1450 mm.

10. A method for the production of a component consisting of batteries, accumulators, lithium-ion accumulators, or lithium-ion batteries comprising the step of incorporating a current collector foil according to claim 1 into said component.

* * * * *